Figure 1:
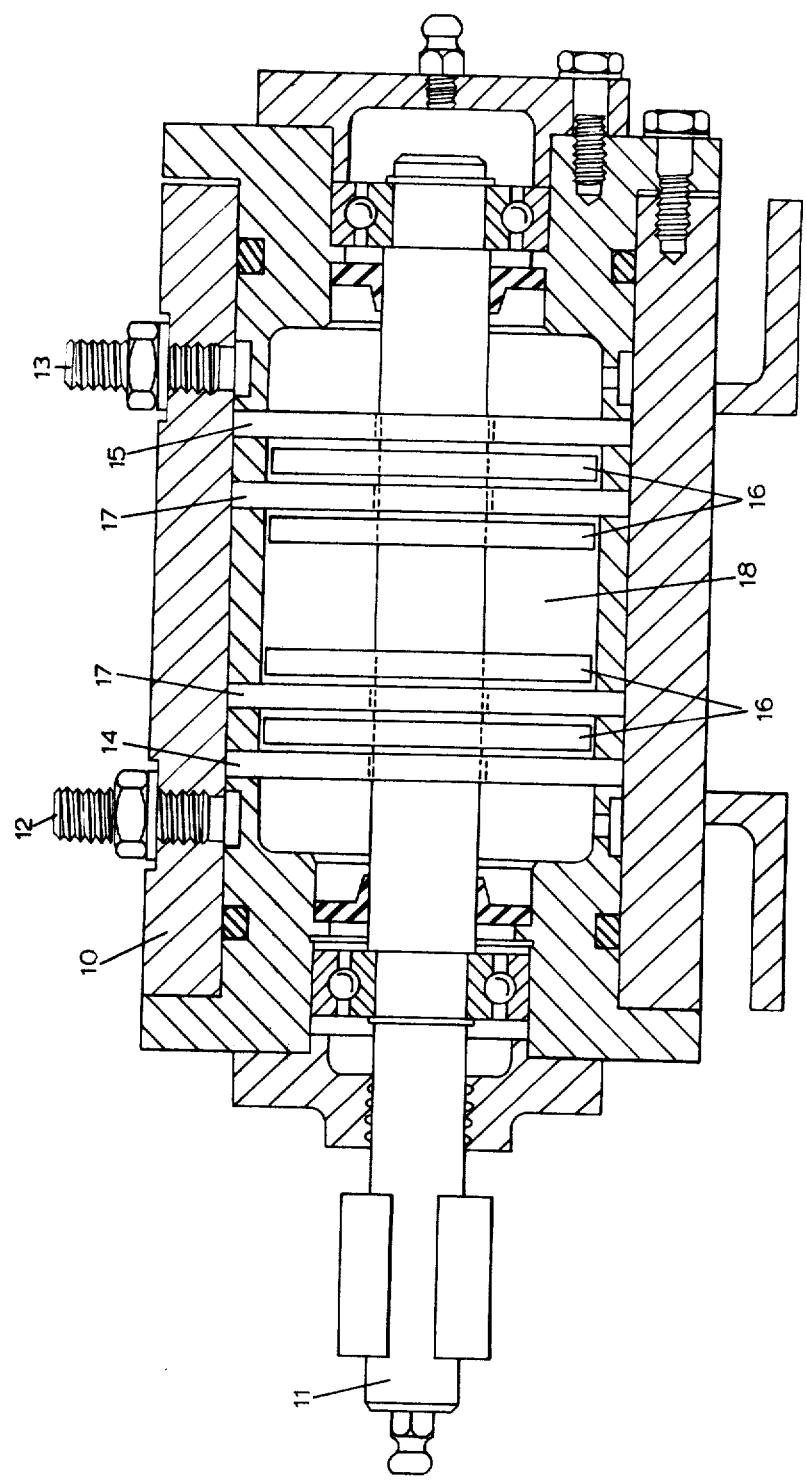

United States Patent [19]

Timby et al.

[11] 4,261,175
[45] Apr. 14, 1981

[54] FUEL SUPPLY APPARATUS

[75] Inventors: Ernest A. Timby, Frimley; Rodney H. Walsh, Hindhead, both of England

[73] Assignee: The Secretary of State for Defence in Her Britannic Majesty's Government of the United Kingdom of Great Britain and Northern Ireland, London, England

[21] Appl. No.: 924,587

[22] Filed: Jul. 14, 1978

[51] Int. Cl.³ .............................................. F02C 3/20
[52] U.S. Cl. ................................. 60/721; 60/39.46 S;
 244/135 R; 252/359 C; 366/307
[58] Field of Search .................... 60/39.46 S, 721;
 44/51 R; 244/135 R; 366/302, 307; 252/359 R, 359 C

[56] References Cited

U.S. PATENT DOCUMENTS

| 2,092,992 | 9/1937 | Thalman | 366/307 X |
| 3,501,914 | 3/1970 | Asher | 60/39.46 S |
| 3,709,664 | 1/1973 | Krekeler et al. | 366/307 X |

FOREIGN PATENT DOCUMENTS 169078 10/1959 Sweden ................................. 366/307

Primary Examiner—Allen M. Ostrager
Assistant Examiner—Stephen F. Husar
Attorney, Agent, or Firm—Pollock, Vande Sande & Priddy

[57] ABSTRACT

Apparatus for degrading safety fuel of the type containing an anti-misting polymer and comprising a bank of interfitting stators and rotors with a plenum chamber at some station along the bank, whereby rotation of the rotors will cause safety fuel pumped through the apparatus to be subjected to sufficient shear and local acceleration to be degraded to a state acceptable for engines and their control apparatus.

9 Claims, 6 Drawing Figures

FUEL SUPPLY APPARATUS

The present invention relates to liquid fuel supply apparatus. It is particularly concerned with apparatus for rendering acceptable to normal liquid fuel supply apparatus and burning elements, especially in aircraft, certain liquid fuels, called safety fuels, which carry an anti-misting additive.

Typically the additive is a polymer of molecular weight greater than $10^6$ or of intrinsic viscosity greater than 2.5 dls/gm and the safety fuel contains sufficient additive to ensure a molecular overlap of the polymer. Such typical safety fuels are described in UK Pat. Nos. 1259113, 1285197 and 1337288.

While it is possible to postulate and manufacture fuel supply and burning apparatus which can filter, pump and burn safety fuel as such, it may be preferred, from the point of view of saving in fuel supply and burning apparatus cost without significant decrement in safety, to degrade the safety fuel and thus render it acceptable to fuel supply and burning apparatus in current use, that is to say that the degraded fuel will not clog the filters, overload or wear the pumps and will atomize and burn at the burners at substantially the normal rate.

According to the present invention apparatus for degrading safety fuels of the type described above has a stator and rotor combination, the rotor adapted to be driven and the combination adapted for the passage therethrough of the safety fuel, whereby in operation the apparatus will shear the fuel, and render it sufficiently fluid to pass through filters and pumps and be atomized at burners.

The degrading apparatus advantageously has a plenum chamber within the stator and rotor combination, thus perhaps incorporating a bank of stators and rotors with a plenum chamber situated between substantially a first half thereof and an exit member thereof. A stator/rotor combination which has been found particularly suitable has entry and exit stators, a forward rotor and stator set and a rearward rotor and stator set, there being a plenum chamber between the forward and rearward stator and rotor sets, wherein at least one of the rotor and stator set stators is of the type having a plurality of blades the function whereof is to reverse the direction of flow of an impinging fluid.

Such a stator enables fluid issuing from a rotor forward thereof to pass therefrom flowing with a substantial velocity component opposite in direction to that of the said issuing fluid, maximizing the shear on the fluid while at the same time minimizing the weight, blockage and manufacturing complexity of the stator. A suitable such stator has a plurality of channels projecting radially therefrom, preferably radially inwardly from a circumferential support, the channels facing against the direction of rotation of the rotors so as to catch most of the fluid issuing from a rotor forward thereof with an angular velocity in one direction and cause it to leave the stator with an angular velocity in the other direction. The stator may have between 6 and 16 channels, and preferably has 12. The channels are advantageously sharp sided to enhance the shear/collection facility thereof. These stators are hereinafter referred to as deflecting stators.

The entry and exit stators and the rotors may comprise perforated discs 2-6 mm, preferably 5 mm thick with right circular holes 4-10 mm, preferably 6 mm, diameter. The rotors are preferably arranged to be driven at a speed greater than 5000 rpm a comparatively high speed, eg 30,000 rpm, has the advantage of efficient degradation and high throughput while a comparatively low speed, eg less than 16000 rpm, has the advantage of of low torque and high equipment life.

In a complete fuel supply apparatus the degrading apparatus may be sited between the reservoir and the filters. In the important aircraft context, where the supply apparatus may comprise a fuel tank, a booster pump, a backing pump, a filter, a heat exchanger, a high pressure pump, flow control and metering apparatus, in substantially that order, the degrader may be sited downstream of the backing pump and upstream of the filter. Two degraders may be employed in parallel, one for operations only in conditions of high fuel demand such as take-off and overshoot. The degrader rotors may, of course, be coupled to and driven by the engine.

A method in accordance with the invention of degrading safety fuel of the type defined, therefore, comprises passing the safety fuel through a degrader as described above while the rotors are being rotated at a speed in excess of 5000 rpm.

Although the safety fuels, as described in the above mentioned UK patents, contain less than 1% of the polymer they cannot be processed by certain current filters and engine control apparatus or burnt at the engine burners. Degraders in accordance with the invention are capable of degrading safety fuel and rendering it processable by this current apparatus.

Figure 2:
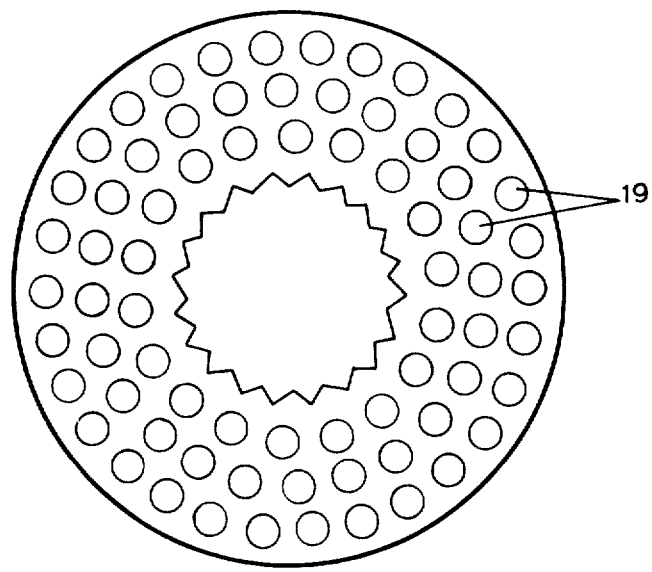
Figure 3:
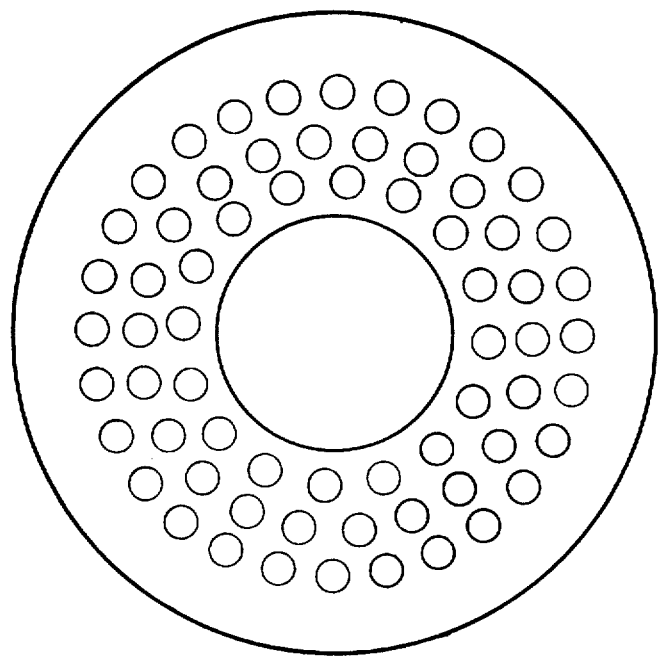
Figure 4:
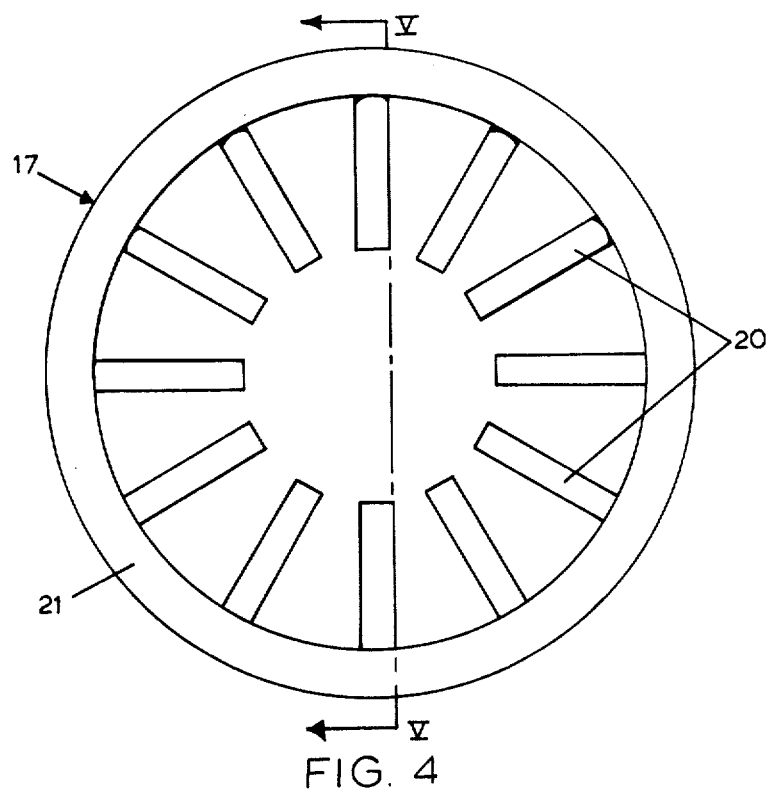
Figure 5:
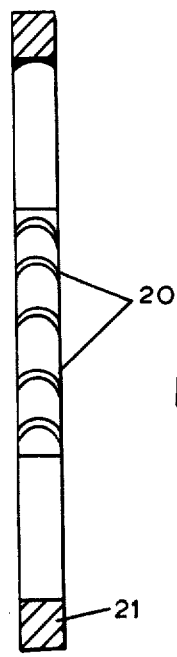
Figure 6:
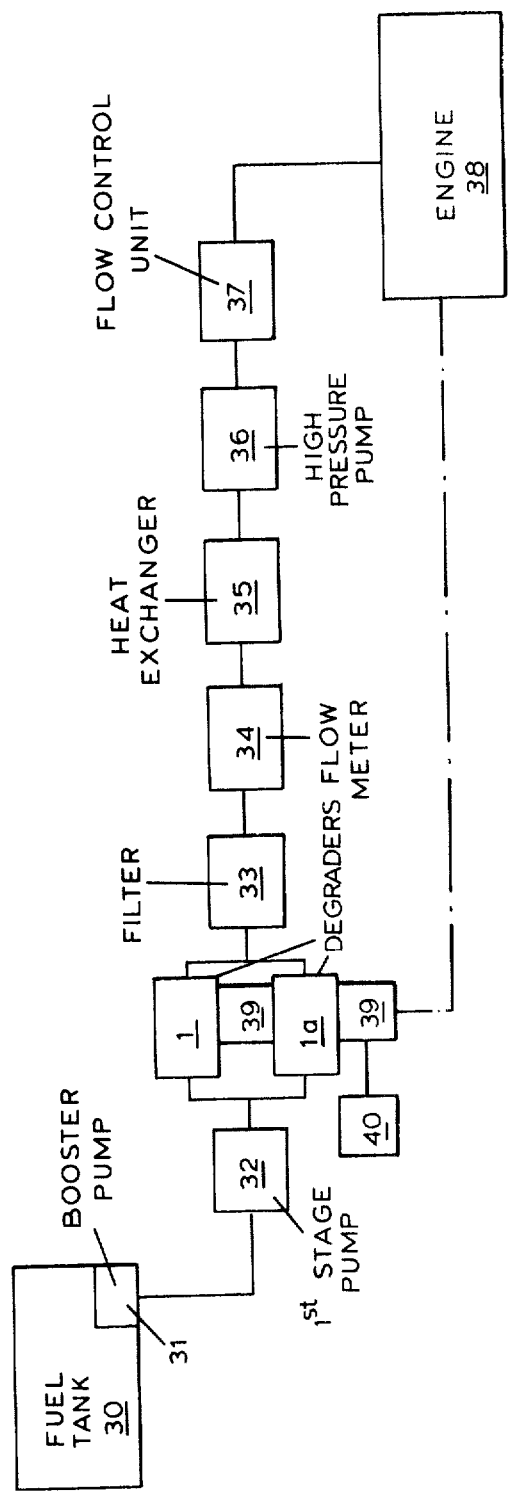

A degrader in accordance with the invention will now be described, by way of example, with reference to the accompanying drawings, of which:

FIG. 1 is a longitudinal section of the degrader,
FIG. 2 is a face view of a typical rotor,
FIG. 3 is a face view of an entry and exit stator,
FIG. 4 is a face view of a deflecting stator,
FIG. 5 is a view on V—V in FIG. 4, and
FIG. 6 is a general layout of an aircraft fuel system incorporating the degrader.

As shown in FIG. 1 the degrader comprises a housing 10 enclosing a stator and rotor bank, the rotors on a shaft 11, there being a fuel inlet 12 upstream of the bank and a fuel outlet 13 downstream thereof.

The stator and rotor bank comprises entry and exit stators 14, 15, rotors 16 and deflecting stators 17, there being a forward and rearward rotor and deflecting stator combination separated by a plenum chamber 18. The stator and rotor bank thus comprises, in the order set out, an entry stator 14, two rotors 16 sandwiching a deflecting stator 17, and then after the plenum chamber 18 two rotors 16 sandwiching a deflecting stator 17, followed by the exit stator 15.

The rotors 16, as shown in FIG. 2, comprise discs perforated with straight and normal holes 19, to the extent that the total perforation area is about 25% of the disc face area.

The entry and exit stators 14, 15 as shown in FIG. 3, are discs perforated in a manner similar to the rotors 16.

The deflecting stators 17 have, as illustrated in FIGS. 4 and 5 twelve scoops 20 projecting radially inward from a rim member 21. Each scoop 20 is a channel of semicircular section with sharp sides and is arranged in use with the channels facing counter to the direction of rotation of the rotors 16.

Two degraders as described above are sited in parallel in an aircraft fuel supply apparatus as illustrated in FIG. 6. This apparatus comprises, connected in line in the order set out, a fuel tank 30 and a booster pump 31, a first stage pump 32, the two degraders 1, 1a in parallel, a filter 33, a fluid flow meter 34, a heat exchanger 35, a high pressure pump 36, and a flow control unit 37 which passes the fuel to the burners of an engine 38. The degraders 1, 1a are mounted on the engine to be driven thereby through suitable reduction gearing 39 and a control mechanism 40.

In operation of the fuel supply apparatus during take-off of an aircraft, safety fuel in the tank 30, that is kerosene containing inter alia about 0.3% by weight of a polymer whereby its propensity to mist is severely hampered, is pumped by the booster pump 31 to the degraders 1, 1a, the rotors 16 whereof are rotating at about 16000 rpm.

In the degraders the fuel is sheared between each successive element, while being subjected to various severe accelerations, by the stators and rotors, per se, and it emerges from the outlet 13 fully fluid and capable of passing through the filter 33 without clogging same but leaving thereon any unwanted solids. From the filter it passes through the rest of the supply apparatus to the engine burners.

On the attainment of cruise speed the degrader 1a is switched off.

In a typical degrader of the type described above, the diameter of the rotor and stator combination is about 73 mm and the diameter of the shaft is about 25 mm. Each element of the combination is about 5 mm thick. The entry and exit stators 14,15 and the rotors 16 are perforated with 4 mm holes 6–7 mm apart on three pitch circles each with a 10 mm increment in diameter. Apart from at the plenum chamber, the rotor and stator elements are separated by a clearance of 0.03–0.05 mm.

No doubt other embodiments of the invention will occur to those skilled in the art. For example rotors similar in form to the deflecting stators could be used, and the or another plenum chamber may be sited toward the rear of the stator and rotor combination. However it is believed that the embodiment particularly described hereinbefore is preferred from constructional, cost, effectiveness, bulk and efficiency points of view.

I claim:

1. A safety fuel degrader comprising:
   a housing,
   a plurality of rotors within said housing and adapted to be rotated therein,
   a plurality of stators fixedly mounted within said housing and interdispersed with said rotors, at least one of said stators comprising a plurality of radially projecting channels arranged to face against the direction of rotation of said rotors,
   a safety fuel inlet to said housing upstream of said stators and rotors, and
   a safety fuel outlet from said housing downstream of said stators and rotors,
   the degrading being operable upon safety fuel pumped through it, when the rotors are rotated, to render the fuel fluid and capable of filtration and atomization.

2. A safety fuel degrader as claimed in claim 1 wherein said channels are sharp-sided.

3. A safety fuel degrader as claimed in claim 1 wherein said rotors and stators are arrayed into a forward rotor and stator combination set and a rearward rotor and stator combination set, and a plenum chamber defined by the housing and located between said forward and rearward combination sets.

4. A safety fuel degrader as claimed in claim 1 wherein some of said stators comprise a perforated disc.

5. A safety fuel degrader as claimed in claim 4 and wherein each said perforated disc is 2–6 mm thick and is perforated with right circular holes 4–10 mm in diameter.

6. A safety fuel degrader as claimed in claim 1 wherein at least some of said rotors comprise perforated discs.

7. A safety fuel degrader as claimed in claim 6 and wherein each said perforated disc is 2–6 mm thick and is perforated with right circular holes 4–10 mm in diameter.

8. A safety fuel degrader as claimed in claim 1 including means for rotating said rotors at a speed in excess of 5000 revolutions per minute.

9. A safety fuel degrader comprising
   a housing,
   a primary stator and rotor combination set,
   a secondary stator and rotor combination set,
   a safety fuel inlet into said housing upstream of said primary combination set,
   a fuel outlet from said housing downstream of said secondary combination set, and
   a plenum chamber in said housing between said primary and secondary combination sets,
   each said combination set comprising a stator in the form of a perforated disc, and two rotors in the form of perforated discs surrounding a deflecting stator having a plurality of sharp sided radially disposed channels opposing the intended direction of rotation of said rotor, and
   said degrader being operable upon safety fuel pumped thereinto via said inlet when said rotors are rotated to subject the fuel to sufficient shear and accelerations to degrade it and render the additive therein non-misting-inhibitive.

* * * * *